United States Patent Office 3,355,417
Patented Nov. 28, 1967

3,355,417
SULFUR-CURED MINERAL-LOADED ALPHA-OLEFINS WITH REDUCED SURFACE BLOOM
Kenneth Vincent Martin, Wilmington, Del., assignor to E. I. du Pont de Nemours and Company, Wilmington, Del., a corporation of Delaware
No Drawing. Filed Oct. 4, 1965, Ser. No. 492,901
8 Claims. (Cl. 260—41)

This invention relates to an improvement in sulfur-curing mineral-loaded α-olefin hydrocarbon elastomer compositions to vulcanizates; more particularly it relates to such improved compositions and vulcanizates which do not develop a surface bloom.

Chain-saturated hydrocarbon copolymers of α-olefins are of great commercial importance today for use in a wide variety of applications. The sulfur-curable copolymers, such as are described in U.S. Patent 2,933,480, are particularly valuable. For many applications, such as wire and cable coatings and shoe soles and heels, these copolymers are loaded with mineral fillers prior to cure. Although outstanding vulcanizates of mineral-loaded stocks can be obtained, better curing procedures with short cure times are particularly desirable. The choice of accelerator systems is of critical importance for obtaining this objective.

Representative mineral-loaded stocks, incorporating copolymers such as ethylene/propylene/1,4-hexadiene copolymers, have required rather high proportions of tetramethyl thiuram monosulfide for attainment of optimum state of cure. Unfortunately, these vulcanizates have developed a white, powdery surface bloom after about three hours to two weeks. The smoky, white appearance is objectionable for certain applications. Surface bloom problems have been encountered in curing black-loaded copolymers of this type and accelerator combinations have been devised to solve the problem. Unfortunately, however, the accelerator systems suitable for rendering black-loaded stocks bloom-free have not displayed enough cure promotion when employed in mineral-loaded stocks. If the concentration of tetramethyl thiuram monosulfide is lowered, heavy bloom still occurs and, additionally, the resultant state of cure is adversely affected.

Processing safety in molding operations is another important consideration and for best results, it is highly desirable to employ a delayed-action accelerator system which permits adequate mixing and loading. Unfortunately, however, when 2-(morpholinothio)benzothiazole, a typical delayed-action accelerator, is substituted for tetramethyl thiuram monosulfide in the mineral-loaded α-olefin copolymer composition, no significant cure occurs.

It has unexpectedly been found that surface bloom of vulcanizates of zinc oxide-containing mineral filler-loaded, sulfur-curable elastomeric copolymers of at least one α-monoolefin and at least one non-conjugated diene can be virtually eliminated by the incorporation, before curing, of the combination of (I) tetramethyl thiuram disulfide, and (II) 2-(morpholinothio)benzothiazole. Even more surprising is that this invention provides satisfactory processing safety and the state of cure is rapidly attained after curing starts.

The present invention involves the use of a delayed-action curing system. As can be seen from the examples hereafter, little or no cure occurs at the curing temperature for several minutes. The extent of the delay depends upon the 2-(morpholinothio)benzothiazole concentration; the greater the proportion of the 2-(morpholinothio)benzothiazole, the longer the delayed action.

It is very surprising that the accelerator system of the present invention permits attainment of a very satisfactory state of cure. As mentioned above, 2-(morpholinothio)benzothiazole does not appear to be able to effect a significant cure in the absence of tetramethyl thiuram disulfide. When, however, the two are used in combination, the vulcanizates obtained show an ultimate state of cure enhanced beyond that resulting with the same proportion of tetramethyl thiuram disulfide alone.

The normally-solid, rubber-like materials employed are copolymers made from at least one α-monoolefin and at least one non-conjugated diene. The α-monoolefins have the structure R—CH=CH$_2$, where R is H or C$_1$-C$_{16}$ alkyl, and are preferably straight-chained. Representative non-conjugated hydrocarbon dienes include: open-chain C$_6$-C$_{22}$ dienes having the structure

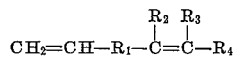

wherein R$_1$ is an alkylene radical, R$_2$, R$_3$ and R$_4$ are independently selected from the group consisting of hydrogen and alkyl radicals; dicyclopentadiene; 5-methylene-2-norbornene; 5-alkenyl-2-norbornenes, 2-alkyl-2,5-norbornadienes; and 1,5-cyclooctadiene.

Representative procedures for making suitable copolymers are given in U.S. Patents 2,933,480; 3,000,866; 3,000,867; 3,063,973; 3,093,620 and 3,093,621 and British Patent 957,105. When cyclic non-conjugated dienes are employed, it is preferred that the reaction mixture contain ethylene and at least one other α-monoolefin, e.g., propylene. The ethylene copolymers should contain about 20 to 75 weight percent ethylene monomer units if they are to be rubber-like. Copolymers of ethylene, propylene, and 1,4-hexadiene are employed in the enumerated examples; to employ other copolymers as described above, one merely substitutes such copolymers in the recipes set forth in the examples.

A wide variety of mineral fillers or mixtures thereof can be employed in the present invention. Representative examples include: kaolin clay, calcined kaolin clay, magnesium silicate, blanc fixe, whiting, silica and talc. Kaolin clay and calcined kaolin clay are particularly suitable. About 20 to 500, preferably 90 to 500 parts of total filler are supplied for each 100 parts by weight of the elastomer.[1] Any kaolin clay which is conventionally used for reinforcing elastomers can be employed to make the mixtures of the present invention. In general, these clays have particle sizes in the range of 2 microns. The finer the particle size, the better the filler responds in giving an improved vulcanizate.

The principal physical characteristics of the clay which are preferred for use in the present invention are: (1) a specific gravity of about 2.6; (2) a 325-mesh screen residue below about 3.5%, preferably below about 0.35%; (3) absorbed moisture content not above about 1%; (4) a particle size distribution wherein at least about 55% by weight of the particles are two microns or less in diameter; and (5) a pH (in water) of about 4.4 to 7, although specially prepared and treated clays may show pH values of 8 or higher.

The particularly valuable mineral filler is kaolin clay. Both the "hard" and the "soft" types can be used. Those skilled in the art readily understand that kaolin clays may have identical crystalline structures, yet differ markedly in their ability to reinforce an elastomer stock. The difference in their reinforcing properties appears to depend upon the difference in their particle size distribution. Those skilled in the art will recognize that a "hard" clay is one which will noticeably reinforce an elastomer stock as reflected by the values of vulcanizate properties such as the modulus at 300% extension. In the case of ---
[1] Typically: hard clays, 70–250 phr.; calcined clays, 70–350; soft clays, 70–350; silicas, 40–250.

the "hard" clays a very high proportion, for example about 90%, of the particles are smaller than 2 microns; in contrast, only about 60–70% of "soft" clay particles are less than 2 microns. Commercially available hard kaolin clays include: "Champion Clay," "Crown Clay," "Harwick No. 1," "Suprex Clay"; soft kaolins include: "Alumex R," "Hi-White R," "McNamee Clay," "Paragon Clay" and "Polyfil F."

The calcined clays used in this invention are made by thermally treating a pure kaolin to remove the interconnecting OH groups in the stacked structure of the platelets. Although the resulting material is called generically as calcined clay, it is often considered more accurate to say that the calcined clay is a complex aluminum silicate. The calcined clay is said to be amorphous as far as X-ray diffraction is concerned. Representative commercial calcined clays are described in Compounding Ingredients for Rubber, mentioned above. "Iceberg Pigment" and "Polyfil 70" are typical useful commercial products.

The proportions of curing agents needed to achieve optimum results for a particular composition can be determined by routine experimentation by those skilled in the art. The following recommendations are based on 100 parts by weight of copolymer: Typically, about 1.2–2.5 parts, preferably 2 parts, of sulfur are used. In general, about 0.5 to 1.5 parts of 2-(morpholinothio)benzothiazole will be employed for every part by weight of tetramethyl thiuram disulfide; the concentration of the latter typically ranges from 1 to 2.5 parts. Highly-extended, hard-clay stocks will require higher levels of accelerators to attain satisfactory cures than soft-clay stocks. Accordingly, hard-clay stocks may require as much as 2.5 parts of tetramethyl thiuram disulfide and at least 2 parts of 2-(morpholinothio)benzothiazole. Frequently 1.5 parts of tetramethyl thiuram disulfide and 1 part of 2-(morpholinothio)benzothiazole are suitable as in Example 4. Usually, about 5 parts of ZnO activator are present.

For attainment of outstanding stress-strain properties, it is highly desirable to add adjuvant amounts (frequently up to 2 phr.) of (1) a non-volatile epoxy compound (e.g., epoxidized polybutadiene, "Epon 812" and the like) and (2) aliphatic amines of the piperazine type or an aromatic compound having at least 2 active amine or hydroxyl groups attached to the aromatic nucleus (e.g., 4,4'-methylenedianiline, m-phenylenediamine and the like).

In addition to the mineral filler and the sulfur-curing system, the copolymer can be compounded with other conventional additives such as antioxidants, pigments, petroleum oils, and the like.

The compounding can be carried out in the conventional equipment such as rubber roll mills or internal mixers of the Banbury type. Since the 2-(morpholinothio)benzothiazole is a relatively high-melting solid (about 180° F.), it is preferred that the system be hot enough to permit it to melt and be dispersed when it is introduced. Thus, when everything is to be added on a rubber roll mill, the mill rolls are initially at about 200° F. However, lower temperatures on the order of 100 to 150° F. may be used if the benzothiazole compound is in the form of a finely divided, easily dispersible powder. After the copolymer has been banded on the mill, all the remaining components, except the sulfur and the tetramethyl thiuram disulfide, can be added in essentially any order although the 2-(morpholinothio)benzothiazole is preferably added last.

For processing convenience, the mineral filler is often added simultaneously with petroleum oil. After the rolls have been cooled to about 100–150° F., the tetramethyl thiuram disulfide and sulfur are introduced. When internal mixers are employed which rapidly disperse the components and generate enough heat to raise the temperature to about 180°–200° F., all the components can be added essentially simultaneously.

The tendency toward blooming will depend upon the type of mineral filler, the type of petroleum oil (if any is employed), and the degree of extension of the stock (the amount of loading). It is believed that the degree of solubility of accelerator by-products in the cured compounds depends upon these factors, the less soluble these by-products, the worse the bloom. Those skilled in the art can vary the relative proportions of tetramethyl thiuram disulfide and 2-(morpholinothio)benzothiazole to reduce and eliminate any blooming observed. Increasing the proportion of 2-(morpholinothio)benzothiazole or reducing the amount of tetramethyl thiuram disulfide will tend to depress tendencies toward bloom. If the tetramethyl thiuram disulfide concentration is decreased unduly, the ultimate state of cure may be adversely affected. On the other hand, if the 2-(morpholinothio)benzothiazole concentration is too great, the delay in the onset of curing may be sufficient to require an impractically long time for attainment of satisfactory cure.

The cure time temperature needed for optimum results for a particular operation can be determined empirically by routine experimentation by those skilled in the art. Representative cure times range from about 5 minutes to 30 minutes with about 10–20 minutes being preferred. The more difficultly curable compositions, such as the hard clay-extended stocks mentioned above, may require at least 20 minutes. These recommendations are based on a preferred curing temperature of 320° F. Higher or lower temperatures, e.g., 307 and 356° F., can be employed if desired.

The invention will now be described with reference to the following examples of specific embodiments thereof wherein parts and percentages are by weight unless otherwise specified.

EXAMPLE 1

*Copolymer A*

An ethylene/propylene/1,4-hexadiene copolymer was made according to the disclosure in U.S. Patent 2,933,480 in tetrachloroethylene in the presence of a diisobutyl aluminum monochloride/vanadium tetrachloride coordination catalyst formed in situ, the copolymer containing about 33% propylene, 3.5% 1,4-hexadiene, the remainder being ethylene. The copolymer contains 0.32 g. mole per kilogram of C=C unsaturated units. It exhibits a Mooney viscosity (ML–4/250° F.) of about 45. To 100 parts of this copolymer was added 1.3 parts of an epoxidized polybutadiene (once commercially available from FMC Corporation as "Oxiron 2000") having a number-average molecular weight of about 1200–1900, a melt viscosity of about 2000 poise at 25° C., and an oxirane oxygen content of about 9 percent. Each molecule has about 7 epoxy groups (about 177 g. of resin contain about 1 gram-mole of epoxide). The iodine number is 185. The epoxy groups are located both at an external position and internally along the hydrocarbon backbone. (See U.S. Patent 3,092,608.)

*Preparation and curing of highly-extended "soft" clay stocks*

Six stocks (A–F), having the following composition, were compounded on a rubber roll mill:

*Highly-extended "soft" clay stocks—mill mixed*

| Component: | Parts |
|---|---|
| Copolymer A | 100 |
| "Soft" kaolin clay [1] | 200 |
| Calcium carbonate (Whiting) | 50 |
| Naphthenic petroleum oil [2] | 85 |
| Zinc oxide | 5 |
| Zinc benzothiazyl sulfide | [3] 1 |
| 4,4'-methylenedianiline | 0.83 |
| Red iron oxide | 5 |
| FEF carbon black | 1 |
| Tetramethyl thiuram disulfied | [4] |
| 2-(morpholinothio)benzothiazole | [4] |

Component:—Continued                                  Parts
  Dipentamethylene thiuram testrasulfide _____  (⁴)
  Sulfur _____   2

[1] "McNamee Clay" (commercially available from R. T. Vanderbilt Co., Inc.) has a specific gravity of 2.62, maximum moisture at 100–105° C. of 1%, and 99.7% passes through a 325-mesh screen.
[2] "Flexon 765" also called "Necton 60" (commercially available from Humble Oil & Refining Co.) has a specific gravity (60/60° F.) 0.8980 and Saybolt viscosity (210° F.) 58 sec.
[3] Except D.
[4] See Table I.

The following general procedure was employed: after the rubber roll had been heated to 200° F., copolymer A was added and banded thereon. Zinc oxide was dispersed. Then the soft kaolin clay and naphthenic petroleum oil were introduced essentially simultaneously. After everything had been homogeneously dispersed, red iron oxide and fine extrusion furnace carbon black were added to provide coloring. Then followed zinc benzothiazyl sulfide and 4,4'-methylenedianiline. Finally, 2-(morpholinothio)-benzothiazole was introduced, melted, and homogeneously dispersed throughout the composition. The rolls were cooled to a temperature in the range 100–150° F. and, in turn, tetramethyl thiuram disulfide and sulfur were added.

The compositions prepared on the rubber roll mill were then cured at 320° F. for 10 minutes. Part of the compositions were heated at 320° F. in a Monsanto ODR machine and the torque values obtained were measured to gain information about the rate of cure as a function of cure time, in particular to get a measure of the delayed action effect provided by the accelerator systems studied. Table I contains the cure rate values as well as stress-strain data for the 10-minute vulcanizates.

Since the compositions had been colored, it was very easy to detect the onset of undesired bloom. As can be seen from the results reported in Table I, compositions A–D corresponding to the present invention could not develop any bloom. Composition E, which is outside the present invention and provided for purposes of comparison, exhibited severe bloom. Composition F, which is also outside the scope of the present invention and is based on a bloom-free accelerator system useful for black-loaded stocks, did not develop bloom but was undercured as can be seen from the high value of the permanent set at break and the low modulus at 300% extension.

TABLE I

| Compound | A | B | C | D | E[1] | F[1] |
|---|---|---|---|---|---|---|
| Tetramethyl Thiuram Disulfide | 1.5 | 1.5 | 1.0 | 1.5 | 2.5 | 0.8 |
| 2-(Morpholinothio) benzothiazole | 2.0 | 1.0 | 1.5 | 1.0 | 0 | 0 |
| Dipentamethylene Thiuram Tetrasulfide | 0 | 0 | 0 | 0 | 0 | 0.8 |
| Zinc Benzothiazyl Sulfide | 1.0 | 1.0 | 1.0 | 0 | 1.0 | 1.0 |
| Torque Values | | | | | | |
| ODR, 320° F.: | | | | | | |
| 1 minute | 1 | 1 | 1 | 1 | 1 | 1 |
| 2 minutes | 1 | 1 | 1 | 1 | 1 | 1 |
| 3 minutes | 1 | 1 | 1 | 1 | 5 | 3 |
| 4 minutes | 2 | 7 | 2 | 3 | 12 | 5 |
| 5 minutes | 8 | 15 | 7 | 10 | 18 | 8 |
| Cure, 10 minutes at 320° F.: | | | | | | |
| Modulus at 100% Ext. (p.s.i.) | 275 | 265 | 225 | 210 | 275 | 200 |
| Modulus at 200% Ext. (p.s.i.) | 460 | 450 | 410 | 370 | 470 | 330 |
| Modulus at 300% Ext. (p.s.i.) | 540 | 540 | 500 | 500 | 570 | 420 |
| Tensile Strength (p.s.i.) | 800 | 700 | 700 | 680 | 790 | 600 |
| Elongation at Break (Percent) | 700 | 760 | 740 | 720 | 680 | 820 |
| Permanent Set (Percent) | 43 | 40 | 53 | 50 | 44 | 68 |
| Bloom [2] | — | — | — | — | +++ | — |

[1] Outside the scope of the present invention; provided for comparison.
[2] A dash means "no bloom". One or more plus signs means "blooming occurred"; the number qualitatively reflects the degree of blooming.

EXAMPLE 2

*Highly-extended "soft" clay stocks—Banbury mixed*

Three stocks (G–I) were prepared having the composition of Stock B of Example 1. The procedure of Example 1 was changed: all components, except sulfur and tetramethyl thiuram disulfide, were introduced at about the same time into a Banbury mixer instead of being added sequentially on a 200° F. rubber roll mill. The following mixing times were followed: Stock G, 2 minutes; Stock H, 4 minutes; Stock I, 6 minutes. After being dumped at 270° F., each of these stocks was compounded on a 100–150° F. rubber roll mill with tetramethyl thiuram disulfide and sulfur and cured as in Example 1. Table II contains the ODR torque values, the stress-strain values for the vulcanizates, and their bloom behavior.

TABLE II

| | G | H | I |
|---|---|---|---|
| | Torque Values | | |
| ORD, 320° F.: | | | |
| 1 minute | 1 | 1 | 4 |
| 2 minutes | 1 | 1 | 5 |
| 3 minutes | 3 | 5 | 10 |
| 4 minutes | 10 | 12 | 14 |
| 5 minutes | 15 | 18 | 16 |
| Cure, 10 minutes at 320° F.: | | | |
| Modulus at 100% Ext. (p.s.i.) | 260 | 275 | 300 |
| Modulus at 200% Ext. (p.s.i.) | 430 | 440 | 550 |
| Modulus at 300% Ext. (p.s.i.) | 510 | 520 | 650 |
| Tensile Strength (p.s.i.) | 700 | 800 | 900 |
| Elongation at Break (Percent) | 760 | 730 | 650 |
| Permanent Set at Break (Percent) | 52 | 50 | 40 |
| Bloom | — | — | — |

EXAMPLE 3

*Medium-extended calcined clay stocks—mill mixed*

Five calcined clay stocks (J–N) having medium extension, were compounded on a rubber roll mill in accordance with the following recipe and by means of the procedure of Example 1:

Component:                                            Parts
  Copolymer A _____  100
  Calcined clay [1] _____  175
  Naphthenic petroleum oil (as in Example 1) _   70
  Zinc oxide _____    5
  Zinc benzothiazyl sulfide _____  1.11
  4,4'-methylenedianiline _____  0.88
  Red iron oxide _____    5
  FEF carbon black _____    1
  Tetramethyl thiuram disulfide _____   1.5
  2-(morpholinothio) benzothiazole _____  (²)
  Morpholine _____  (²)
  Sulfur _____    2

[1] "Iceberg Pigment" (commercially available from the Burgess Company) containing 45–52% silica and 38–44% alumina, and having no loss in weight on ignition. Specific gravity—2.63.
[2] See Table III.

The compositions thus prepared were cured for 10 minutes at 320° F. ODR torque values and the properties of the vulcanizates are reported in Table III.

TABLE III

| Compound | J | K | L | M[1] | N[1] |
|---|---|---|---|---|---|
| Tetramethyl Thiuram Disulfide | 1.5 | 1.5 | 1.5 | 1.5 | 1.5 |
| 2-(Morpholinothio) benzothiazole | 2 | 1.5 | 1.0 | 0 | 0 |
| Morpholine | 0 | 0 | 0 | 0 | 2 |
| Zinc Benzothiazyl Sulfide | 1 | 1 | 1 | 1 | 1 |
| Cure, 10 minutes at 320° F.: | | | | | |
| Modulus at 100% Ext. (p.s.i.) | 300 | 210 | 315 | 200 | 200 |
| Modulus at 200% Ext. (p.s.i.) | 550 | 470 | 560 | 450 | 440 |
| Modulus at 300% Ext. (p.s.i.) | 680 | 670 | 680 | 650 | 600 |
| Tensile Strength (p.s.i.) | 1,080 | 1,000 | 1,000 | 1,100 | 1,050 |
| Elongation at Break (percent) | 660 | 700 | 650 | 750 | 750 |
| Permanent Set at Break (percent) | 30 | (2) | 30 | (2) | (2) |
| Bloom | — | — | ½+ | +++ | + |
| Torque Values | | | | | |
| ODR, 320° F.: | | | | | |
| 1 minute | 1 | 1 | 1 | 1 | 1 |
| 2 minutes | 1 | 1 | 1 | 1 | 1 |
| 3 minutes | 1 | 1 | 1 | 1 | 1 |
| 4 minutes | 1 | 1 | 1 | 2 | 4 |
| 5 minutes | 1 | 1 | 4 | 14 | 12 |
| 6 minutes | 3 | 4 | 12 | 24 | 22 |

[1] Outside the scope of the present invention provided for comparison.
[2] Not determined.

For the purposes of comparison only, three calcined clay stocks, T, R and S, having medium extension were compounded on a rubber roll mill in essential accordance with the recipe and procedure of Example 3 except as noted below:

| Component | Parts | | |
|---|---|---|---|
| | T[1] | R[1] | S[1] |
| Tetramethyl Thiuram Disulfide | 1.5 | 0 | 0 |
| 2-(Morpholinothio)benzothiazole | 0 | 1.5 | 3.0 |

[1] Outside the scope of the present invention.

All were outside the scope of the present invention and provided for purpose of comparison, in particular to show that the 2-(morpholinothio)benzothiazole has not been shown to cure the stock in the absence of the tetramethyl thiuram disulfide.

After T, R and S had been heated for 20 minutes at 320° F., the following results were noted:

| | T[1] | R[1] | S[1] |
|---|---|---|---|
| Modulus at 100% Ext. (p.s.i.) | 300 | | |
| Modulus at 200% Ext. (p.s.i.) | 640 | | |
| Modulus at 300% Ext. (p.s.i.) | 850 | [Insufficiently cured to test.] | |
| Tensile Strength (p.s.i.) | 1,100 | | |
| Extension at Break (percent) | 540 | | |
| Permanent Set (percent) | 21 | | |
| Hardness | 62 | | |

[1] Outside the scope of the present invention.

EXAMPLE 4

*Highly-extended "hard" clay stocks—mill mixed*

Two highly-extended hard clay stocks (O and P) were compounded on a rubber roll mill according to the general procedure of Example 1 and the following recipe.

| Component: | Parts |
|---|---|
| Copolymer A | 100 |
| Hard Clay [1] | 200 |
| Naphthenic Petroleum Oil | 60 |
| Zinc Oxide | 5 |
| 4,4'-Methylenedianiline | 0.83 |
| Zinc Benzothiazyl Sulfide | 1.0 |
| Red Iron Oxide | 5 |
| FEF Carbon Black | 1 |
| Tetramethyl Thiuram Disulfide | (2) |
| 2-(Morpholinothio)benzothiazole | (2) |
| Sulfur | 2 |

[1] "Suprex Clay"—an air-floated "hard" kaolin clay (commercially available from J. M. Huber Corporation, New York, N.Y.) containing 44–46% silica, 37.5–39.5% alumina, 1.5–2.0% iron oxide, and 1–2% $TiO_2$, and about 14% ignition loss.
[2] See Table IV.

These compositions thus obtained were cured for 15 and 20 minutes at 320° F. Table IV contains the data about the vulcanizate properties as well as ODR torque values showing the rate of cure.

TABLE IV

| Compound | O | P[1] |
|---|---|---|
| Tetramethyl Thiuram Disulfide | 2.0 | 2.5 |
| 2-(Morpholinothio)benzothiazole | 1.0 | 0 |
| 15/320° F.: | | |
| Modulus at 100% Ext. (p.s.i.) | 500 | 520 |
| Modulus at 200% Ext. (p.s.i.) | 1,300 | 1,250 |
| Tensile Strength (p.s.i.) | 1,750 | 1,750 |
| Elongation at Break (percent) | 510 | 540 |
| Permanent Set (percent) | 58 | 63 |
| 20/320° F.: | | |
| Modulus at 300% Ext. (p.s.i.) | 1,350 | 1,300 |
| Permanent Set (percent) | 50 | 50 |
| Bloom | — | ++ |
| Torque Values | | |
| ODR 320° F.: | | |
| 1 minute | 7 | 7 |
| 2 minutes | 7 | 7 |
| 3 minutes | 7 | 11 |
| 4 minutes | 16 | 16 |
| 5 minutes | 22 | 20 |
| 6 minutes | 28 | 25 |

[1] Outside the scope of the present invention; provided for comparison.

EXAMPLE 5

A stock, Q, was compounded on a rubber roll mill by the general procedure of Example 1 according to the following recipe.

| Component: | Parts |
|---|---|
| Copolymer A | 100 |
| Zinc oxide | 5 |
| Soft clay (see Example 1) | 135 |
| Hard clay (see Example 4) | 135 |
| Barytes ($BaSO_4$) | 230 |

| Component:—Continued | Parts |
|---|---|
| Paraffinic petroleum oil [1] | 80 |
| Red iron oxide | 10 |
| Zinc benzothiazyl sulfide | 1.1 |
| 4,4'-methylenedianiline | 0.88 |
| Tetramethyl thiuram disulfide | 2.5 |
| 2-(morpholinothio)benzothiazole | 1.5 |
| Sulfur | 2 |

[1] "Sunpar 150" (commercially available from Sun Oil Company) specific gravity (60/60° F.) 0.880 and Saybolt viscosity (210° F.) 63 sec.

The barytes was added along with the clay.

The vulcanizate, obtained after 10 minutes at 320° F., displayed the following properties:

TABLE V

| | Q |
|---|---|
| Modulus at 100% ext. (p.s.i.) | 390 |
| Modulus at 200% ext. (p.s.i.) | 520 |
| Modulus at 300% ext. (p.s.i.) | 600 |
| Tensile strength (p.s.i.) | 700 |
| Extension at break (percent) | 480 |
| Permanent set (percent) | 54 |
| Shore A hardness | 71 |
| Bloom | None | to X, Y and Z, respectively, except that 2-(morpholinothio)benzothiazole is absent. The recipes were as follows:

| Component | X | Y | Z |
|---|---|---|---|
| Copolymer B | 100 | 0 | 0 |
| Copolymer C | 0 | 100 | 0 |
| Copolymer D | 0 | 0 | 100 |

| | Common to X, Y, and Z |
|---|---|
| Zinc Oxide | 5 |
| Calcined Clay | 175 |
| Naphthenic Petroleum Oil | 70 |
| Red Iron Oxide | 5 |
| FEF Carbon Black | 1 |
| Zinc Benzothiazyl Sulfide | 1 |
| Tetramethyl Thiuram Disulfide | 2 |
| 2-(Morpholinothio)benzothiazole | 1.5 |
| Sulfur | 2 |

All six stocks were then cured at 320° F. for 20 min. The table which follows gives the properties of typical vulcanizates.

TABLE VI

| Property | X | X' | Y | Y' | Z | Z' |
|---|---|---|---|---|---|---|
| Modulus at 100% Ext. (p.s.i.) | 160 | 150 | 300 | 290 | 150 | 140 |
| Modulus at 200% Ext. (p.s.i.) | 290 | 260 | 500 | 450 | 270 | 260 |
| Modulus at 300% Ext. (p.s.i.) | 400 | 350 | 600 | 520 | 300 | 290 |
| Tensile Strength (p.s.i.) | 1,050 | 950 | 1,200 | 1,250 | 1,100 | 1,000 |
| Extension at Break (percent) | 770 | 770 | 720 | 730 | 850 | 740 |
| Permanent Set at Break (percent) | 40 | 42 | 119 | 128 | 58 | 42 |
| Bloom | ½+ | +++ | − | ++ | − | +++ |

EXAMPLE 6

Copolymer B

Copolymer B was an ethylene/propylene/1,4-hexadiene copolymer made in tetrachloroethylene in the presence of a diisobutyl aluminum monochloride/vanadium oxytrichloride coordination catalyst in accordance with the disclosure in U.S. Patent 2,933,480. The copolymer contains about 44 weight percent propylene, 4 weight percent hexadiene, the remainder being ethylene. It exhibits a Mooney viscosity (ML-4/250° F.) of about 70 and contains about 0.37 g. mole per kilogram of C=C unsaturated units.

Copolymer C

Copolymer C was an ethylene/propylene/dicyclopentadiene copolymer made according to the teachings in U.S. Patent 3,000,866 in hexane in the presence of a diisobutyl aluminum monochloride/VCl$_4$ coordination catalyst. The copolymer contains about 28.5 weight percent propylene, 5 weight percent dicyclopentadiene, the remainder being ethylene. It exhibits a Mooney viscosity (ML-4/250° F.) of about 105.

Copolymer D

Copolymer D was an ethylene/propylene/5-methylene-2-norbornene copolymer made in accordance with the general procedures of U.S. Patent 3,093,621. The copolymer contains about 43 weight percent propylene, 3.2–4.5 weight percent 5-methylene-2-norbornene, the remainder being ethylene. The Mooney viscosity (ML-4/250° F.) is about 73.

Six stocks X, X', Y, Y', Z and Z' were compounded on a rubber roll mill; the temperature was in the range 100–150° F. for X and X', 220° F. for the rest. Stocks, X', Y' and Z' are outside the scope of the present invention and are provided for purpose of comparison; they correspond It is believed that the bloom is caused by the presence or ultimate formation of zinc salts of dithiocarbamic acid which are eventually oxidized to products incompatible with the elastomeric copolymer.

This invention enables the preparation of bloom-free vulcanizates useful in all the many existing applications of chain-saturated α-olefin hydrocarbon copolymer elastomers plus all the other applications where undesirable blooming rendered such elastomers unsuitable.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. In a process for the sulfur-curing of zinc oxide-containing, mineral filler-loaded elastomeric copolymers of at least one α-monoolefin and at least one non-conjugated hydrocarbon diene; the improvement of reducing the surface bloom from said cured copolymers which consists in incorporating, before cure, of (I) about 1 to 2.5 parts of tetramethyl thiuram disulfide per 100 parts of copolymer, and (II) about 0.5 to 1.5 parts of 2-(morpholinothio)benzothiazole per part of (I).

2. A process improvement as defined in claim 1 wherein said copolymer is a copolymer of ethylene, propylene and a non-conjugated hydrocarbon diene.

3. A process improvement as defined in claim 1 wherein the mineral filler is kaolin clay or calcined kaolin clay in an amount of about 90 to 500 parts per 100 parts of copolymer.

4. A sulfur-curable, zinc oxide-containing, mineral filler-loaded elastomeric copolymer of at least one α-monoolefin and at least one non-conjugated hydrocarbon diene containing (I) about 1 to 2.5 parts of tetramethyl thiuram disulfide per 100 parts of copolymer, and (II) about 0.5 to 1.5 parts of 2-(morpholinothio)benzothiazole per part of (I).

5. The composition as defined in claim 4 wherein said copolymer is a copolymer of ethylene, propylene and a non-conjugated hydrocarbon diene.

6. The composition as defined in claim 5 containing up to 2 parts per hundred of epoxidized polybutadiene.

7. The composition as defined in claim 4 wherein said mineral filler is kaolin clay or calcined kaolin clay in an amount of about 90 to 500 parts per 100 parts of copolymer.

8. The composition as defined in claim 4 having been subjected to curing conditions.

References Cited

UNITED STATES PATENTS 3,296,183   1/1967   Schoenbeck _____ 260—41

OTHER REFERENCES

Ind. Eng. Chem. Prod. Res. Develop. 2, 16–21 (1963), Lichty et al.

MORRIS LIEBMAN, *Primary Examiner.*

S. L. FOX, *Assistant Examiner.*